(12) United States Patent
Mori et al.

(10) Patent No.: US 7,705,719 B2
(45) Date of Patent: Apr. 27, 2010

(54) WHEEL POSITION DETECTING DEVICE AND TIRE AIR PRESSURE DETECTING DEVICE USING THE SAME

(75) Inventors: Masashi Mori, Oobu (JP); Nobuya Watabe, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 287 days.

(21) Appl. No.: 11/902,071

(22) Filed: Sep. 18, 2007

(65) Prior Publication Data

US 2008/0068147 A1    Mar. 20, 2008

(30) Foreign Application Priority Data

Sep. 19, 2006    (JP) .............................. 2006-253043

(51) Int. Cl.
    *B60C 23/00* (2006.01)
(52) U.S. Cl. .................. 340/447; 340/445; 340/10.1; 340/426.33
(58) Field of Classification Search .............. 340/447, 340/444–446, 825.54, 445, 442–443, 448, 340/572.1, 10.1, 10.3, 572.2, 572.3, 572.4, 340/426.33
See application file for complete search history.

(56) References Cited

U.S. PATENT DOCUMENTS

| | | | | |
|---|---|---|---|---|
| 3,873,965 | A * | 3/1975 | Garcia | ......................... 340/447 |
| 5,602,524 | A * | 2/1997 | Mock et al. | .................. 340/447 |
| 5,612,671 | A * | 3/1997 | Mendez et al. | .............. 340/447 |
| 5,774,047 | A * | 6/1998 | Hensel, IV | ................... 340/442 |
| 6,175,302 | B1 * | 1/2001 | Huang | ......................... 340/442 |
| 6,604,416 | B2 * | 8/2003 | Tsujita | ...................... 73/146.5 |
| 6,838,985 | B2 * | 1/2005 | Ghabra et al. | ............... 340/445 |
| 7,015,801 | B1 | 3/2006 | Juzswik | |
| 7,131,323 | B2 * | 11/2006 | Hirota | .......................... 73/146 |
| 2004/0135681 | A1 * | 7/2004 | Tsujita | ....................... 340/442 |

FOREIGN PATENT DOCUMENTS

| | | |
|---|---|---|
| JP | 3212311 | 7/2001 |
| JP | 2005-162118 | 6/2005 |
| JP | 2006-224799 | 8/2006 |

\* cited by examiner

*Primary Examiner*—Daniel Previl
(74) *Attorney, Agent, or Firm*—Nixon & Vanderhye PC

(57) ABSTRACT

A tire air pressure detecting device determines whether an abnormality has occurred in a transmitter. When a response is not received from the transmitter mounted on a wheel, wheel information detection is retried because an abnormality may have occurred in the transmitter. A triggering device is provided on the vehicle-body side and requests a response from the transmitter corresponding to the relevant wheel. The wheel information detection is retried by the triggering device being instructed to output a trigger signal (re-try trigger signal) at a timing (phase) differing from a steady transmission. As a result, the tire air pressure detecting device can accurately determine whether the unresponsive state of the transmitter is caused by an abnormality in the transmitter or by another cause.

10 Claims, 13 Drawing Sheets

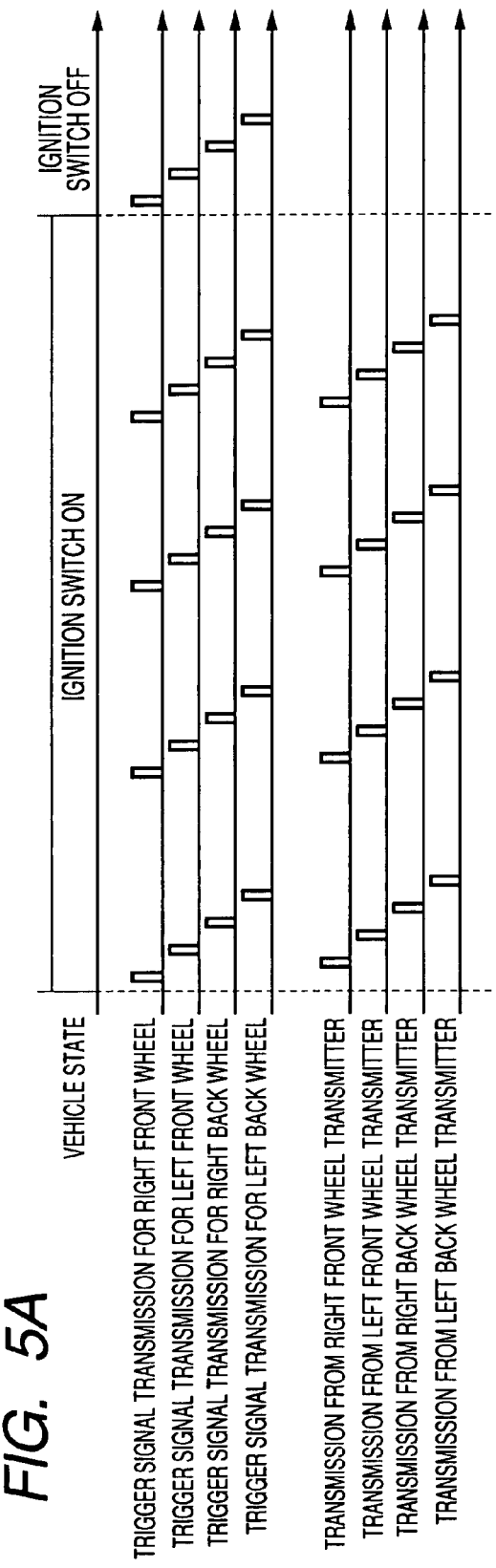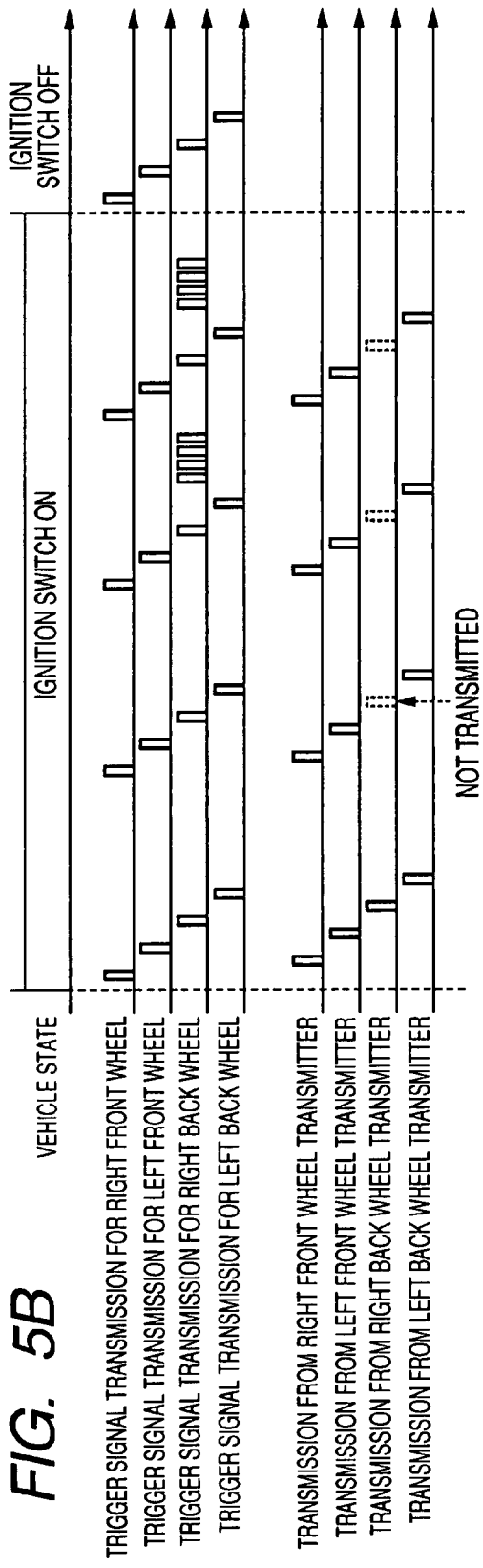

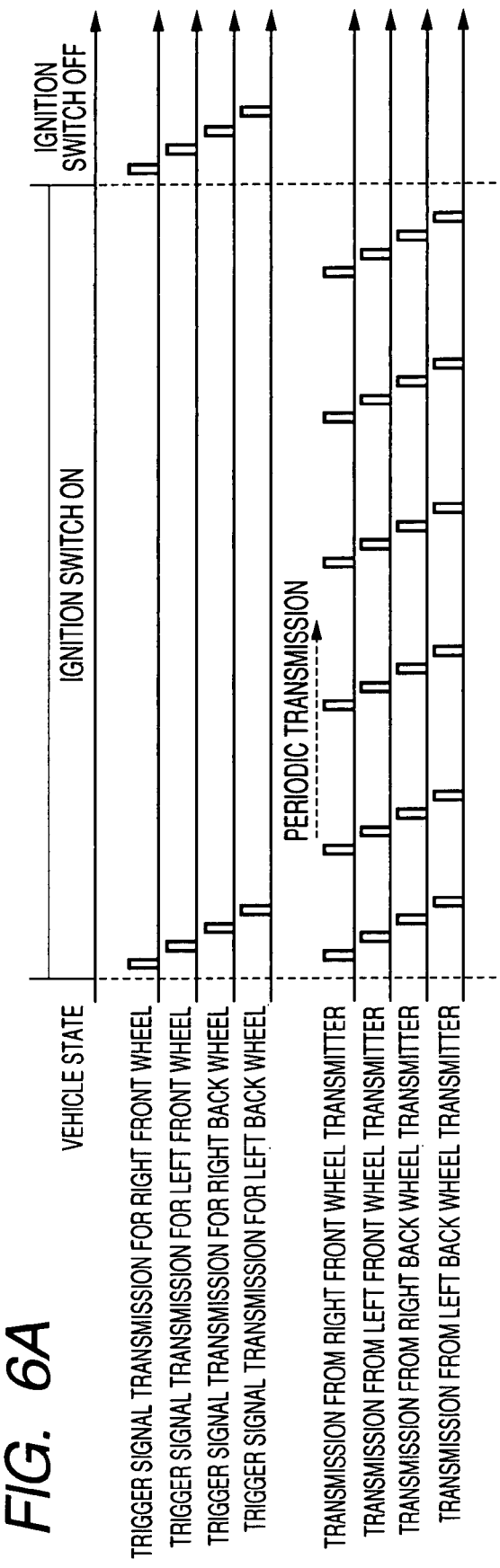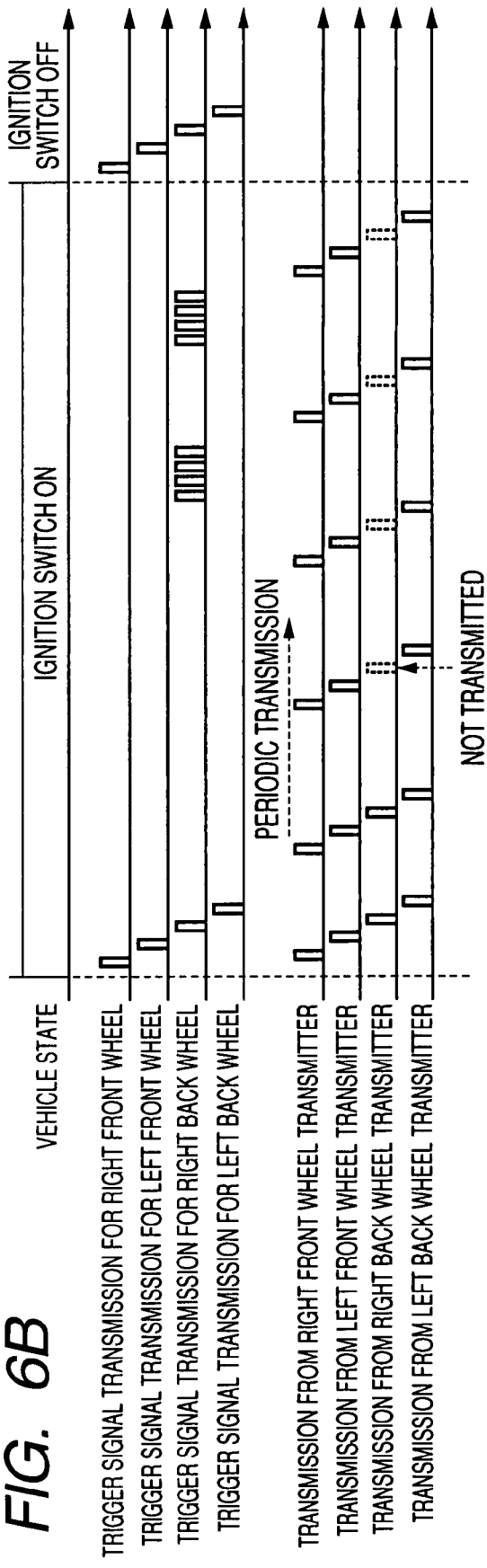

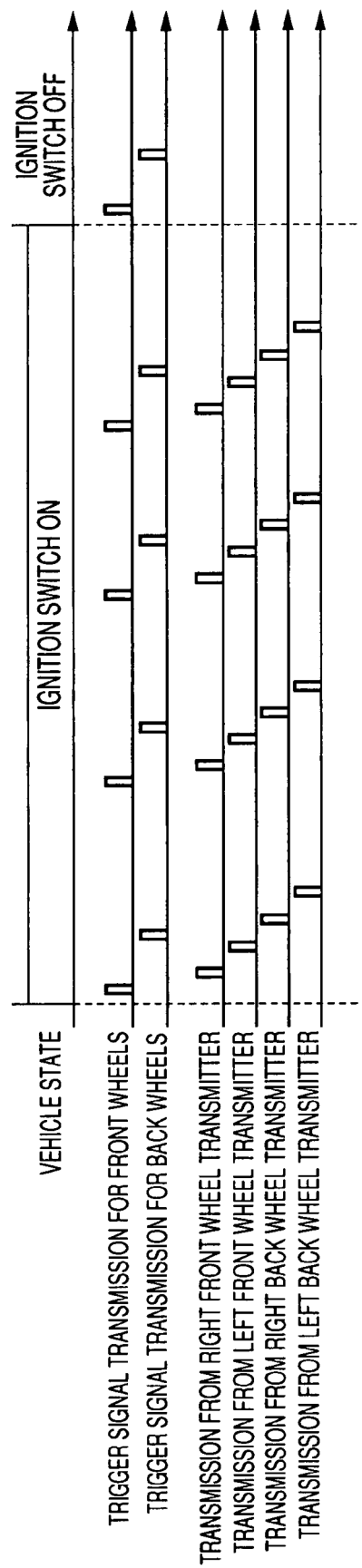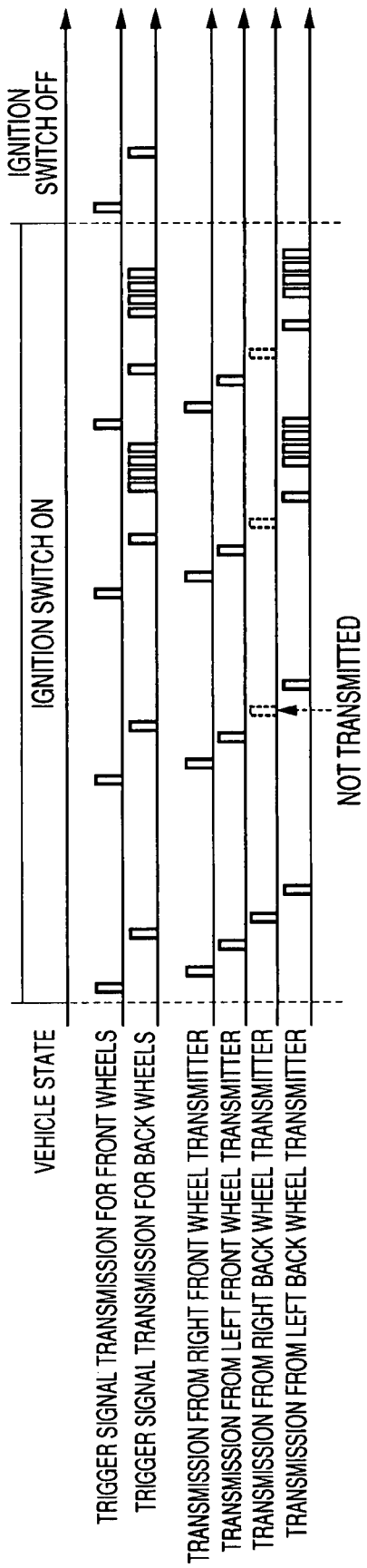

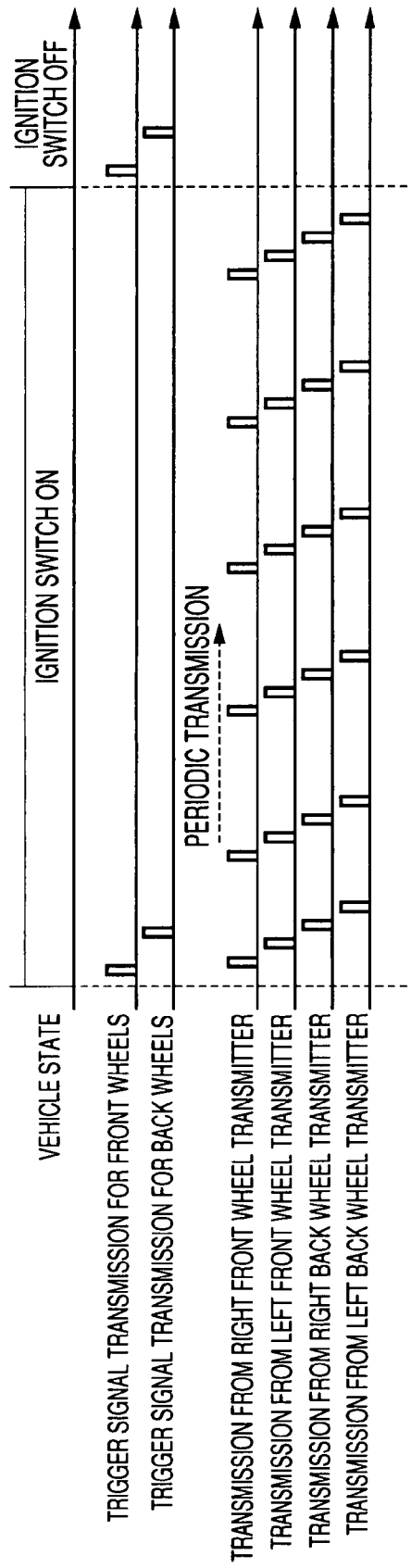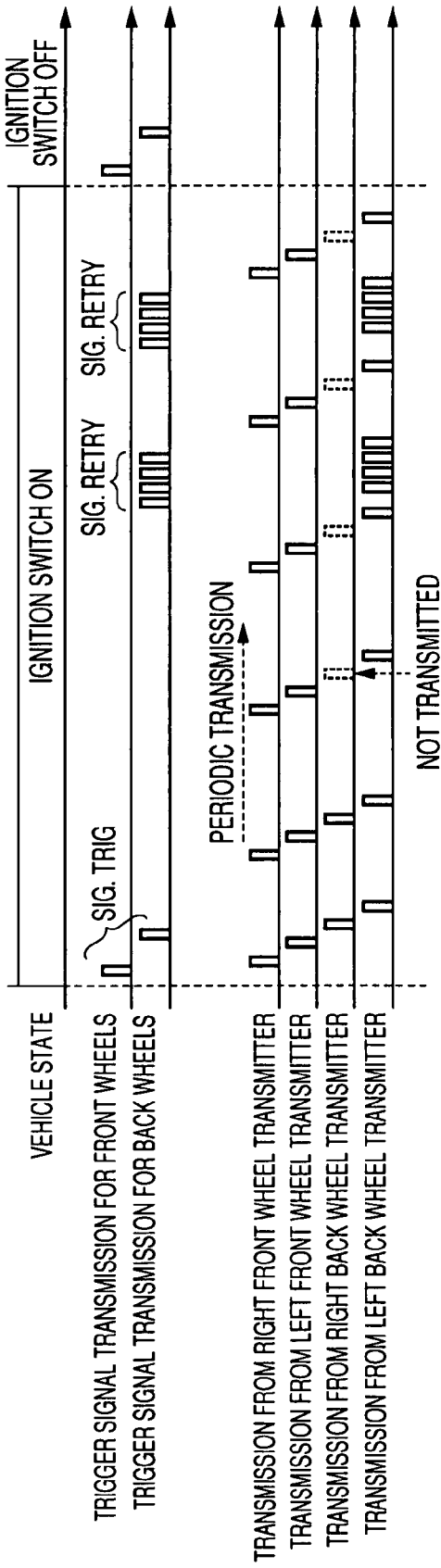

WHEEL POSITION DETECTING DEVICE AND TIRE AIR PRESSURE DETECTING DEVICE USING THE SAME

CROSS-REFERENCE TO RELATED APPLICATION

This application is based on and claims the benefit of priority from earlier Japanese Patent Application No. 2006-253043 filed on Sep. 19, 2006, the description of which is incorporated herein by reference.

BACKGROUND OF THE INVENTION

1. Field of the Invention

The present invention relates to a tire air pressure detecting device. In particular, the present invention relates to a direct-type tire air pressure detecting device provided with a transmitter including a pressure sensor directly mounted on a wheel. A tire is attached to the wheel.

2. Description of the Related Art

Conventionally, a direct-type tire air pressure detecting device is known as a tire air pressure detecting device. In the direct-type tire air pressure detecting device, a transmitter including a sensor, such as a pressure sensor, is directly mounted on a wheel side of a vehicle. A tire is attached to the wheel. An antenna and a receiver are provided on the vehicle-body side. The tire air pressure detecting device operates as follows. After the transmitter transmits a detection signal from the sensor, the receiver receives the detection signal, via the antenna, and the tire air pressure detecting device performs tire air pressure detection (refer to, for example, Japanese Patent No. 3212311).

The tire air pressure detecting device adds identification (ID) information to data transmitted from the transmitter so that whether the transmitting data is that of the vehicle on which the tire air pressure detecting device is mounted (owner's vehicle) and the wheel on which the transmitter is mounted can be determined. The ID information is used to determine whether the vehicle is the owner's vehicle or another vehicle. The ID information is also used to determine the wheel on which the transmitter is mounted. The ID information is registered to the receiver in advance. When the data transmitted from the transmitter is received, the tire air pressure detecting device determines the wheel to which the data belongs using the received ID information (refer to, for example, Japanese Patent No. 3212311).

However, in a direct-type tire air pressure detecting device such as this, the transmitter mounted on the wheel is physically separated from the receiver mounted on the vehicle body. When the transmitter does not transmit data, whether this is caused by a failure in the transmitter, noise from an external source or merely as a result of the position of the transmitter is unclear. Therefore, when the transmitter does not transmit data, judgment on whether a driver is required to be notified of the data not being transmitted from the transmitter, for example, cannot be appropriately made.

SUMMARY OF THE INVENTION

In light of the above-described issues, an object of the present invention is to enable judgment on whether a transmitter does not transmit tire air pressure-related data because of a failure in the transmitter or because of other causes, when the transmitter does not transmit the tire air pressure-related data.

To achieve the above-described object, in the invention, a second controlling unit provided in a receiver includes a judging means and a re-try processing means (a detecting means including the re-try processing means is referred to as a "shifted re-try timing re-detecting means"). The judging means judges whether a frame is received at a timing at which a transmitter transmits the frame. When the judging means judges that the frame is not received, the re-try processing means outputs an instruction signal to a triggering device instructing an output of a trigger signal at a timing differing from the timing at which the frame is transmitted. The re-try processing means performs a re-try process to make the transmitter re-transmit the frame.

BRIEF DESCRIPTION OF THE DRAWINGS

A preferred form of the present invention is illustrated in the accompanying drawings in which:

FIG. 5A is a timing chart of when an abnormality does not occur in the transmitter mounted on each wheel in FIG. 1;

FIG. 5B is a timing chart of when an abnormality occurs in the transmitter mounted on a right rear wheel in FIG. 1;

FIG. 6A is a timing chart of when a tire air pressure detecting device according to a second embodiment of the present invention performs the tire air pressure detection process and a timing chart of when an abnormality does not occur in the transmitter mounted on each wheel;

FIG. 6B is a timing chart of when the tire air pressure detecting device according to the second embodiment of the present invention performs the tire air pressure detection process and a timing chart of when an abnormality occurs in a transmitter mounted on a right rear wheel;

FIG. 10A is a timing chart of when an abnormality does not occur in a transmitter mounted on each wheel in FIG. 7;

FIG. 10B is a timing chart of when an abnormality occurs in the transmitter mounted on each wheel in FIG. 7;

FIG. 11A is a timing chart of when a tire air pressure detecting device according to a fourth embodiment of the present invention performs the tire air pressure detection process and a timing chart of when an abnormality does not occur in the transmitter mounted on each wheel; and FIG. 11B is a timing chart of when the tire air pressure detecting device according to the fourth embodiment of the present invention performs the tire air pressure detection process and a timing chart of when an abnormality occurs in a transmitter mounted on a right rear wheel.

DETAILED DESCRIPTION OF THE PREFERRED EMBODIMENTS

Exemplary embodiments of the present invention are below described in detail with reference to the attached drawings. Sections according to each embodiment, hereafter, that are the same or equivalent are given same reference numbers in the diagrams.

First Embodiment

First, a configuration of a tire air pressure detecting device according to a first embodiment will be described using FIG. 1, FIG. 2, and FIG. 3.

Figure 1:
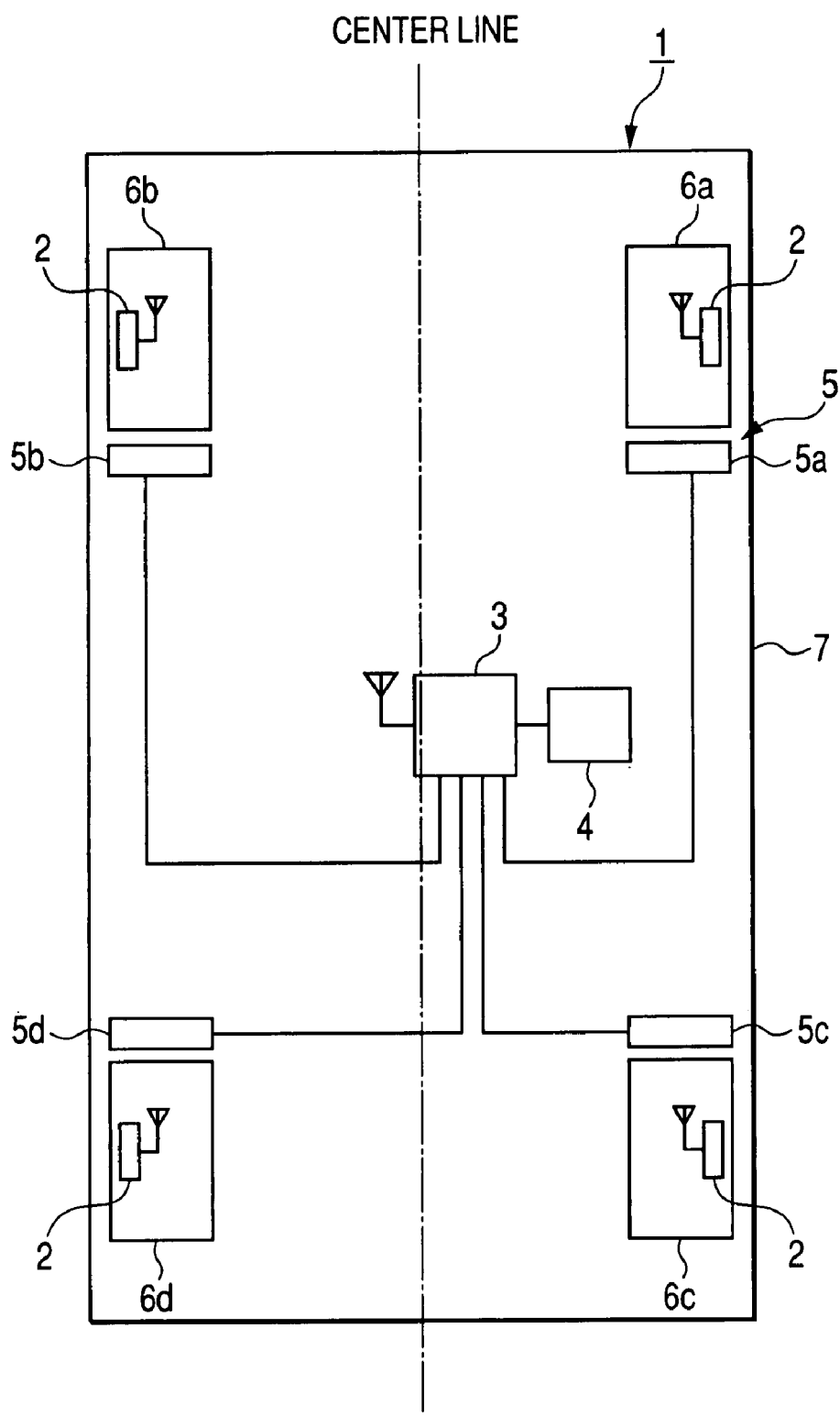
FIG. 1 is a diagram of an overall configuration of a tire air pressure detecting device according to a first embodiment of the invention.

FIG. 1 is a diagram of an overall configuration of the tire air pressure detecting device according to the first embodiment of the invention. The upper section of FIG. 1 when the diagram is printed on paper indicates the front of a vehicle 1. The lower section of FIG. 1 indicates the rear of the vehicle 1.

As shown in FIG. 1, the tire air pressure detecting device is mounted on the vehicle 1. The tire air pressure detecting device includes transmitters 2, a receiver 3, a display 4, and triggering devices 5.

A transmitter 2 is mounted on each of four wheels 6a to 6d (five wheels if a spare tire is included) of the vehicle 1. The transmitter 2 detects the air pressure of a tire attached to each wheel 6a to 6d. The transmitter 2 also stores detection signal data indicating a detection result in a transmission frame (i.e., a frame of data being transmitted) and transmits the frame. The receiver 3 is mounted on a vehicle-body 7 side of the vehicle 1. The receiver 3 receives the transmission frame transmitted from the transmitter 2. The receiver 3 also performs various processes, calculations, and the like based on the detection signal stored in the transmission frame, thereby determining the tire air pressure.

Figure 2A:
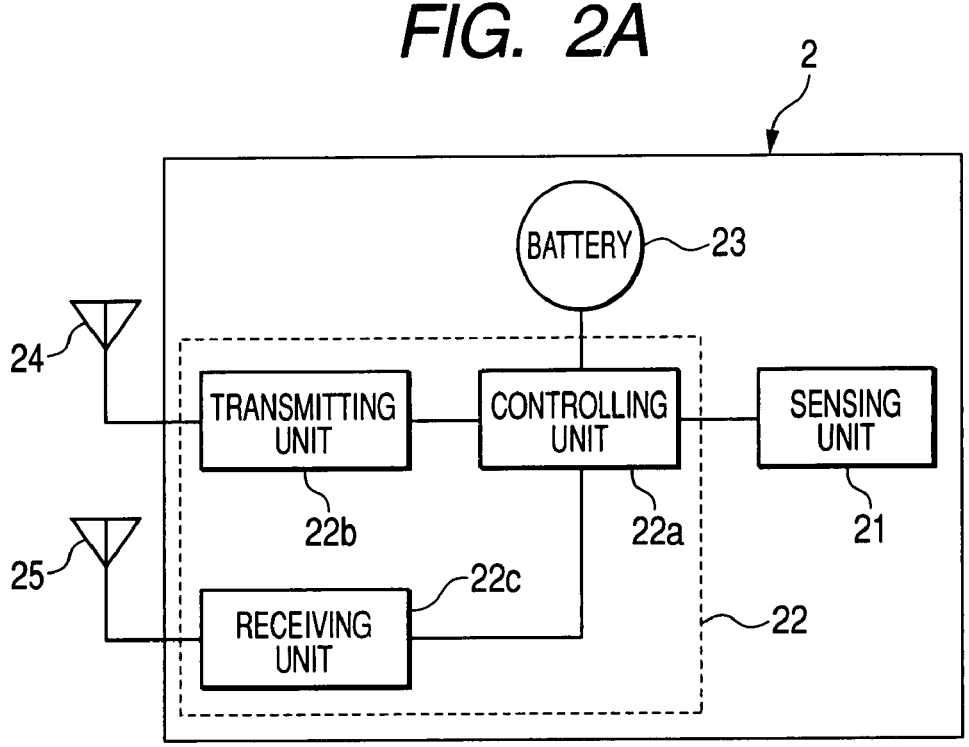
FIG. 2A is a block diagram of a transmitter in FIG. 1.
Figure 2B:
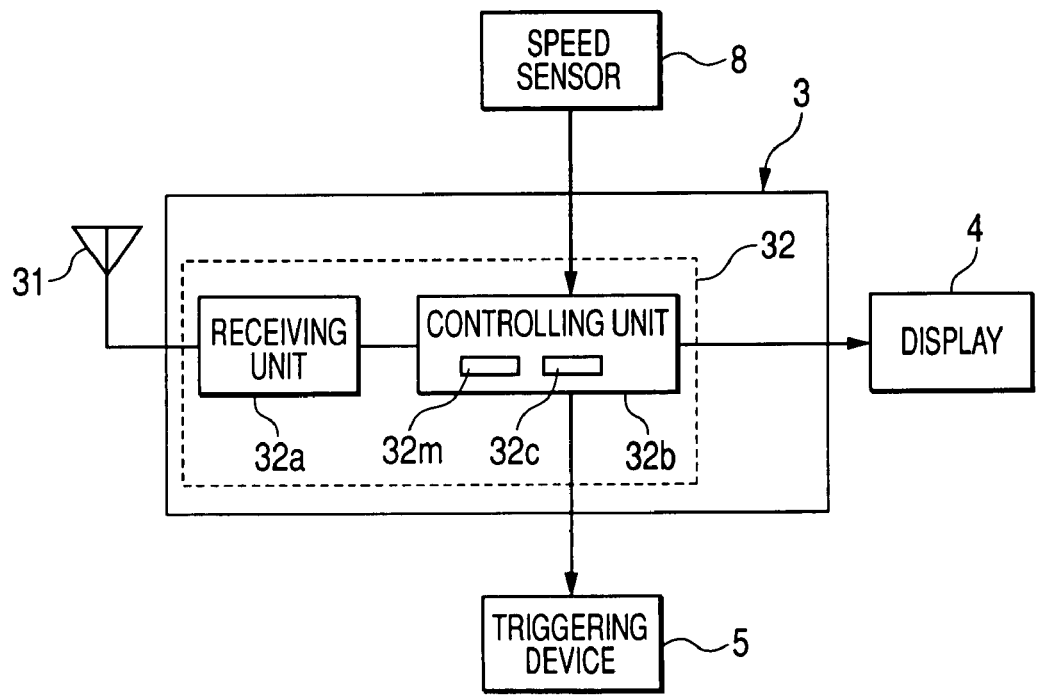
FIG. 2B is a block diagram of a receiver in FIG. 1.

FIG. 2A and FIG. 2B are block diagrams of the transmitter 2 and the receiver 3.

As shown in FIG. 2A, the transmitter 2 includes a sensing unit 21, a microcomputer 22, a battery 23, a transmission antenna 24, and a reception antenna 25.

The sensing unit 21 includes, for example, a diaphragm-type pressure sensor or a temperature sensor. The sensing unit 21 outputs a detection signal depending on the tire air pressure or a detection signal depending on the temperature.

The microcomputer 22 is a known microcomputer including a controlling unit (a first controlling unit) 22a, a transmitting unit 22b, a receiving unit 22c, and the like. The microcomputer 22 performs a predetermined process in adherence to a program stored in a memory (not shown) in the controlling unit 22a.

The first controlling unit 22a receives the detection signal related to the tire air pressure from the sensing unit 21 and performs signal processing on the received detection signal. The controlling unit 22a also processes the detection signal as required. The controlling unit 22a stores the processed detection signal, in addition to the ID information of each transmitter 2, in a transmission frame. The detection signal is stored as data indicating the detection result (referred to, hereinafter, as tire air pressure-related data). The controlling unit 22a then transmits the frame to the transmitting unit 22b. Specifically, the controlling unit 22a receives a trigger signal from the triggering device 5, via the reception antenna 25 and the receiving unit 22c. When the trigger signal is received, the controlling unit 22a transmits the transmission frame storing the tire air pressure-related data to the transmitting unit 22b.

The transmitting unit 22b functions as an outputting unit that transmits the transmission frame sent from the controlling unit 22a to the receiver 3, via the transmission antenna 24. The transmitting unit 22b uses radio frequency (RF) bandwidth, such as a 310 MHz radio wave.

The receiving unit 22c functions as an inputting unit that receives the trigger signal and transmits the received trigger signal to the controlling unit 22a, via the reception antenna 25.

The battery 23 supplies power to the controlling unit 22a and the like. Tire air pressure-related data collection performed by the sensing unit 21, various calculations performed by the controlling unit 22a, and the like are achieved through reception of the power supply from the battery 23.

The transmitter 2 configured as described above is, for example, mounted on an air injection valve in each wheel 6a to 6d. The transmitter 2 is disposed so that the sensing unit 21 is exposed on the inner side of the tire. As a result, the tire air pressure of the tire is detected. The transmission frame is transmitted, via the transmission antenna 24 provided on each transmitter 2, every time the trigger signal is received by the reception antenna 25.

As shown in FIG. 2B, the receiver 3 includes an antenna 31 and a microcomputer 32.

The antenna 31 is a single, shared antenna that performs an overall reception of the frames each transmitted from a transmitter 2. The antenna 31 is fixed onto the vehicle-body 7.

The microcomputer 32 is a known microcomputer including a receiving unit 32a, a controlling unit (second controlling unit) 32b, and the like. The microcomputer 32 performs a predetermined process in adherence to a program stored in a memory (not shown) within the controlling unit 32b.

The receiving unit 32a functions as an inputting unit that, when the frame transmitted from the transmitter 2 is received by the antenna 31, inputs the frame and transmits the frame to the controlling unit 32b.

The second controlling unit 32b outputs a trigger instruction signal instructing the triggering device 5 to output the trigger signal. The controlling unit 32b receives the frame sent from the receiving unit 32a and performs various kinds of signal processing, calculations, and the like, based on the tire air pressure-related data stored in the frame, and thereby determines the tire air pressure. The controlling unit 32b transmits an electrical signal to the display 4, depending on the determined tire air pressure. For example, the controlling unit 32b compares the determined tire air pressure with a predetermined threshold value Th. When a decrease in the tire air pressure is detected, the controlling unit 32b outputs a signal indicating the decrease in the tire air pressure to the display 4. As a result, the display 4 is notified of the decrease in the tire air pressure in a wheel among the four wheels 6a to 6d.

As shown in FIG. 1, the display 4 is disposed in a location visible to a driver. The display 4 is, for example, a warning lamp provided on an instrument panel in the vehicle 1. For example, when a signal indicating the decrease in the tire air pressure is sent from the controlling unit 32b in the receiver 3, the display 4 displays a notification of the decrease, thereby notifying the driver of the decrease in the tire air pressure.

The triggering device 5 outputs the trigger signal when a trigger instruction signal sent from the controlling unit 32b in the receiver 3 is inputted. The trigger signal is a low frequency (LF) signal of, for example, 134 kHz and has a predetermined signal strength. According to the embodiment, a first triggering device 5a, a second triggering device 5b, a third triggering device 5c, and a fourth triggering device 5d are provided, respectively corresponding to the wheel 6a, the wheel 6b, the wheel 6c, and the wheel 6d. The reception strengths of the trigger signals outputted from the first triggering device 5a, the second triggering device 5b, the third triggering device 5c, and the fourth triggering device 5d are set to a degree allowing the trigger signals to be received only by the transmitter 2 mounted on the wheels respectively corresponding to the first triggering device 5a, the second triggering device 5b, the third triggering device 5c, and the fourth triggering device 5d, among the wheels 6a to 6d.

The triggering device 5 can be mounted anywhere as long as the location is not completely covered by metal. The triggering device 5 is preferably mounted on a location that is not covered by metal and is not hit by stones and the like while moving, such as within a liner or within the interior of the vehicle 1.

Figure 3A:
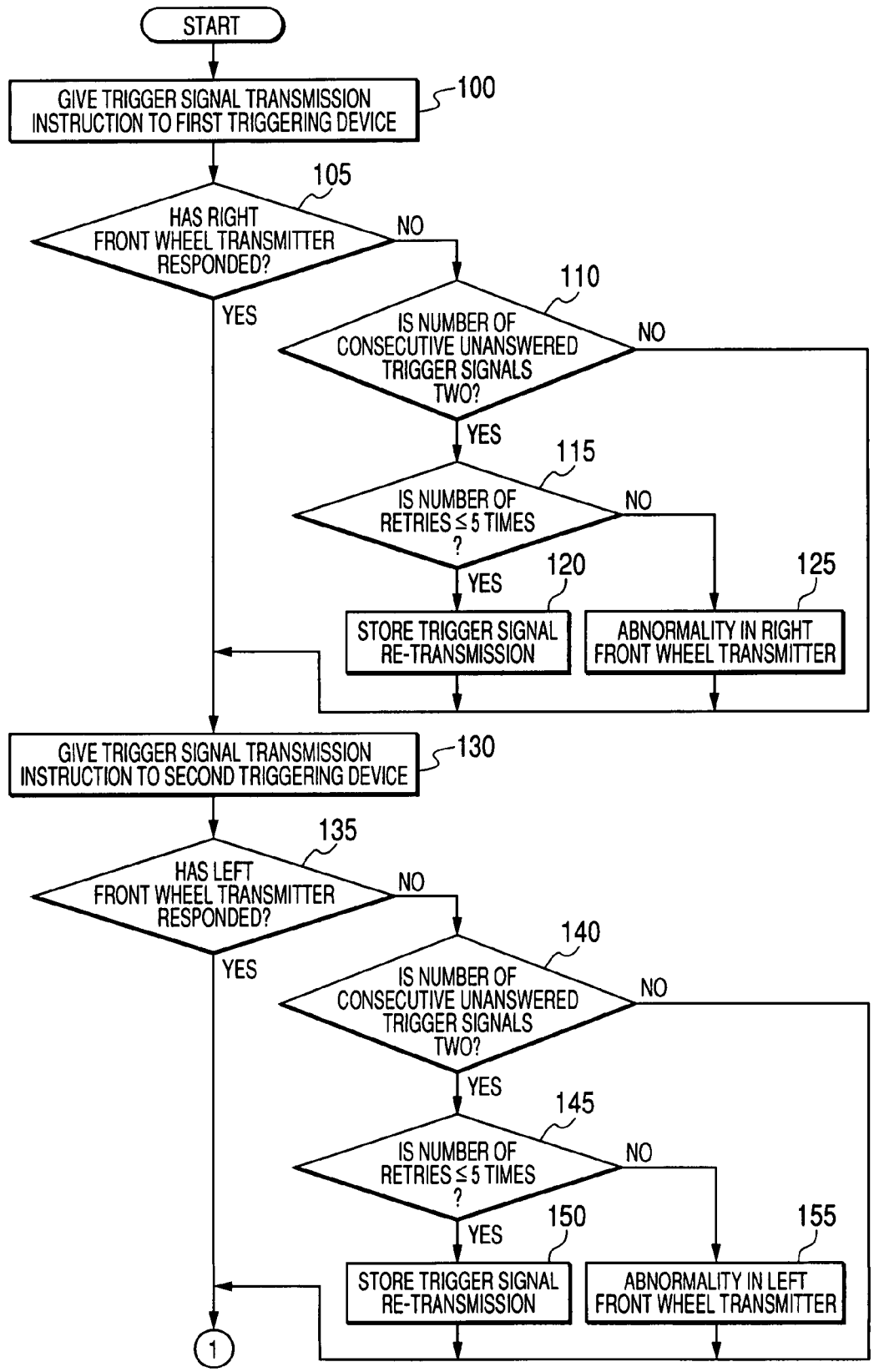
FIG. 3A is a flowchart of a tire air pressure detection process performed by a controlling unit of the receiver in FIG. 2B.
Figure 3B:
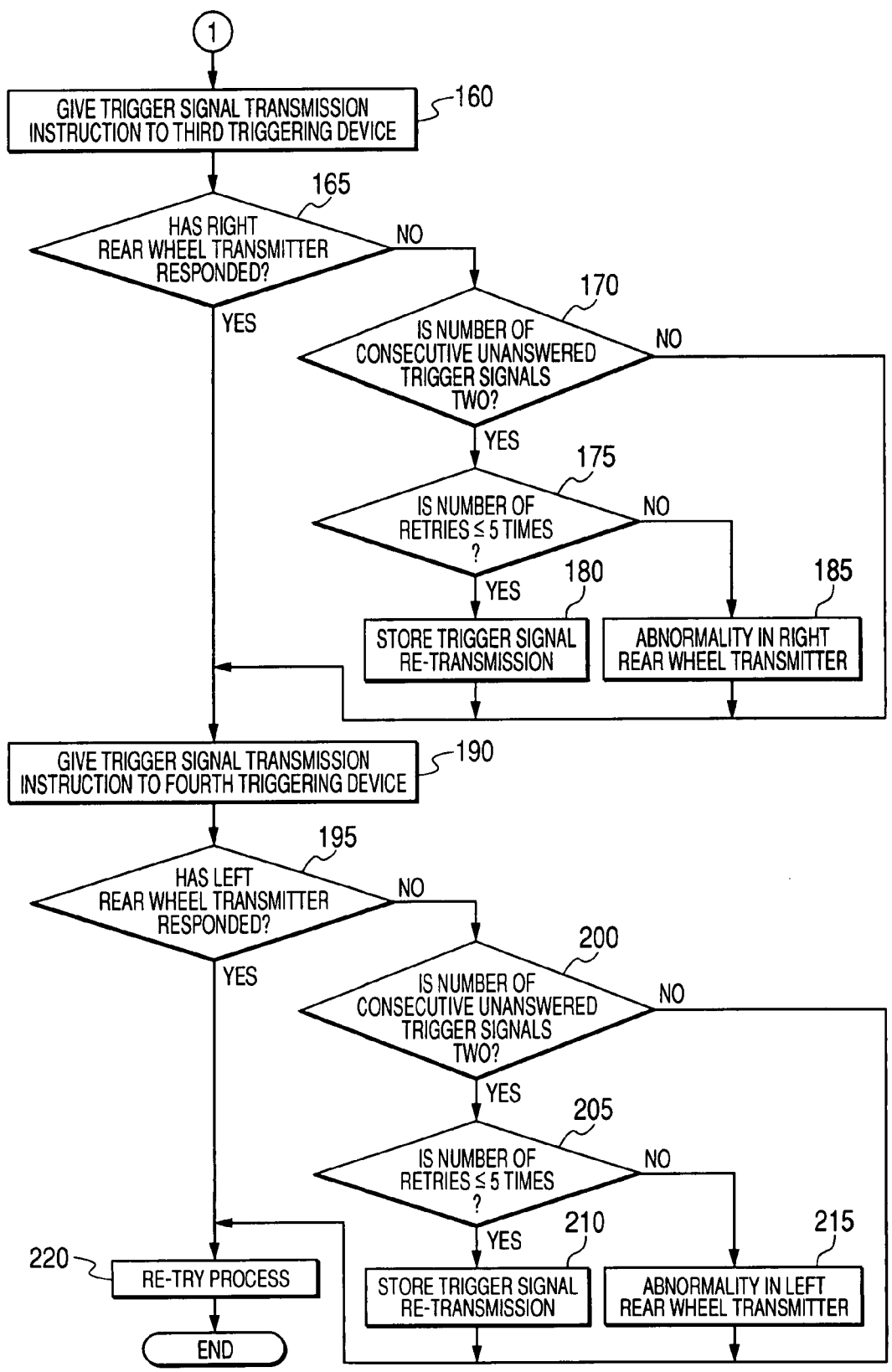
FIG. 3B is a flowchart of the tire air pressure detection process continued from FIG. 3A.

Next, a tire air pressure detection method used by the tire air pressure detecting device according to the embodiment will be described. The tire air pressure detecting device performs the tire air pressure detection when an ignition switch (not shown) is switched from OFF to ON. The tire air pressure detection is performed as a result of the controlling unit 32b of the receiver 3 performing a tire air pressure detection process. FIG. 3A and FIG. 3B are flowcharts of the tire air pressure detection process. The tire air pressure detection method will be described with reference to FIG. 3A and FIG. 3B.

First, at Step 100, after a predetermined amount of time passes after the power is turned ON, the controlling unit 32b transmits a trigger instruction signal to the first triggering device 5a. When the trigger instruction signal is inputted into the first triggering device 5a, the first triggering device 5a outputs a trigger signal to a transmitter 2 mounted on a right front wheel 6a. The trigger signal has a predetermined signal strength.

When the trigger signal is inputted into the controlling unit 22a, via the reception antenna 25 and the receiving unit 22c of the transmitter 2 mounted on the right front wheel 6a, the controlling unit 22a enters a wake-up state. The controlling unit 22a stores the tire air pressure-related data in a frame in addition to ID information added to differentiate each transmitter 2. The controlling unit 22a transmits the frame.

Next, at Step 105, the controlling unit 32b judges whether the transmitter 2 has responded to the trigger signal outputted from the first triggering device 5a. The transmitter 2 may not be able to receive the trigger signal when, in addition to a transmitter 2 failure and a dead battery in the transmitter 2, trigger signal output strength is affected by the surrounding environment of the vehicle 1, such as the vehicle 1 being parked near a facility or equipment emitting radio interference. The transmitter 2 also may not be able to receive the trigger signal when radio signals cannot easily reach the transmitter 2 because the transmitter 2 is positioned on the opposite side of the first triggering device 5a, sandwiching the right front wheel 6a therebetween or because of influence from a vehicle-body component between the transmitter 2 and the antenna 31. Therefore, judgment is required to be made on whether the transmitter 2 does not respond because of a situation of which the driver is required to be notified.

At this time, when the trigger signal output strength is strong, a transmitter 2 other than the transmitter 2 mounted on the right front wheel 6a corresponding to the first triggering device 5a may respond. The trigger signal output strength is preferably adjusted, as described above, so that only the transmitter 2 mounted on the right front wheel 6a responds.

The strength of the trigger signal outputted from the first triggering device 5a and the second triggering device 5b weakens with distance. Therefore, reception strength of the trigger signal received by each transmitter 2 can be made to differ by the distances from the first triggering device 5a and the second triggering device 5b to each wheel 6a to 6d being made to differ. Transmission timing of the transmitter 2 can be adjusted depending on the reception strength. Whether the frame is sent from the transmitter 2 mounted on the right front wheel 6a can be determined even when the transmitters 2 mounted on the other wheels 6b to 6d respond, if, for example, the transmission timing of each transmitter 2 is set depending on the reception strength, the receiver 3 stores the relationship between the trigger signal reception strength at each transmitter 2 and the transmission timing, and the timing at which each transmitter 2 responds can be known.

When the transmitter 2 does not respond or the response from the transmitter 2 cannot be received by the receiver 3, the controlling unit 32b increments a counter value of a counter 32c installed in the controlling unit 32b by one, thereby storing the number of unanswered trigger signals. The counter 32c is used for counting unanswered trigger signals. Subsequently, at Step 110, the controlling unit 32b judges whether the number of consecutive unanswered trigger signals is a predetermined number (two, herein). The predetermined number omits instances in which the trigger signal is accidentally unanswered because of the reasons described above, not because of the trigger 3 failure and the like. As a result, frequent re-tries can be prevented. When the trigger signal is unanswered for the first time, merely that the trigger signal is unanswered is stored. When the trigger signal is unanswered for the second time, each process described above is retried.

Therefore, the controlling unit 32b proceeds to Step 115 when the trigger signal is unanswered for the second time, the counter value of the counter 32c installed in the controlling unit 32b becomes two, and the judgment at Step 110 is YES. At Step 115, the controlling unit 32b judges whether a number of re-tries is equal to or less than five times. The number of re-tries herein indicates a number of times the trigger signal output to the right front wheel 6a has been performed. The number of re-tries is counted at Step 305, described hereafter, by a counter used for counting the number of re-tries (not shown) installed in the controlling unit 32b. If the number of re-tries is five times or less, the controlling unit 32b proceeds to Step 120. The controlling unit 32b determines that a re-try is required, and stores data indicating that trigger signal re-transmission is to be performed. The controlling unit 32b stores the data in a memory 32m provided within the controlling unit 32b, such as by setting a flag indicating that the re-try is required to be performed on the right front wheel 6a.

In this way, the second controlling unit 32b preferably includes an unanswered trigger signal frequency judging means (110, 140, 170, and 200). The unanswered trigger signal frequency judging means judges whether the number of times the judging means does not receive the frame has reached a number of times decided in advance. When the number of unanswered trigger signal frequency judging means judges that the frame has not been received for the predetermined number of times, the unanswered trigger signal frequency judging means preferably makes the re-try processing means perform the re-try process. As a result, the re-try process can be prevented from being performed frequently. The re-try process can be prevented from being performed even when the frame accidentally cannot be received, rather than because of the transmitter 2 failure and the like.

As described hereafter, the tire air pressure detection is performed by trigger signal transmission being performed to wheels other than the right front wheel 6a, namely the wheels 6b to 6d. When data transmission of the other wheels 6b to 6d and the re-try are simultaneously performed, reception may not be possible because transmission data are simultaneously transmitted. Therefore, the re-try is required to be performed after the tire air pressure detection of all wheels 6a to 6d have been completed. Alternatively, the re-try is performed so as to avoid the tire air pressure detection timing of each wheel 6a to 6d. Here, that the re-try is required to be performed for the right front wheel 6a is stored at Step 120, and the tire air pressure detections of the other wheels 6a to 6d are performed first.

At the same time, at Step 115, the controlling unit 32b proceeds to Step 125 without performing the re-try, if the number of re-tries exceeds the predetermined number of times (five times, herein) based on the above-described counter value. In this case, the occurrence of the transmitter 2 failure or a dead battery can be considered. Therefore the controlling unit 32b outputs a notification to the display 4 indicating that an abnormality has occurred in the transmitter 2 mounted on the right front wheel 6a. As a result, the display 4 displays a notification that an abnormality has occurred in the transmitter 2 mounted on the right front wheel 6a.

In subsequent Step 130 to Step 155, the same processes as those at Step 100 to Step S125 are performed on the left front wheel 6b. In other words, the controlling unit 32b outputs the trigger instruction signal to the second triggering device 5b. The controlling unit 32b judges whether the transmitter 2 mounted on the left front wheel 6b responds to the trigger signal. When the transmitter 2 does not respond twice consecutively, and the number of re-tries is equal to or less than the predetermined number of times (five times, herein), the controlling unit 32b determines that a re-try is required for the left front wheel 6b and stores data indicating that trigger signal re-transmission is to be performed. If the transmitter 2 does not respond even when the number of re-tries exceeds the predetermined number of times, the controlling unit 32b outputs a signal to the display 4 indicating an abnormality in the transmitter 2 of the left front wheel 6b.

Similarly, when the tire air pressure detection for the left front wheel 6b is completed, the same processes as those at Step 100 to Step 125 are performed for the right rear wheel 6c at Step 160 to Step 185. In other words, the controlling unit 32b outputs the trigger instruction signal to the third triggering device 5c. The controlling unit 32b judges whether the transmitter 2 mounted on the right rear wheel 6c responds to the trigger signal. When the transmitter 2 does not respond twice consecutively, and the number of re-tries is equal to or less than the predetermined number of times (five times, herein), the controlling unit 32b determines that a re-try is required for the right rear wheel 6c and stores data indicating that trigger signal re-transmission is to be performed. If the transmitter 2 does not respond even when the number of re-tries exceeds the predetermined number of times, the controlling unit 32b outputs a signal to the display 4 indicating an abnormality in the transmitter 2 of the right rear wheel 6c.

Furthermore, when the tire air pressure detection for the right rear wheel 6c is completed, the same processes as those at Step 100 to Step 125 are performed for the left rear wheel 6d at Step 190 to Step 215. In other words, the controlling unit 32b outputs the trigger instruction signal to the fourth triggering device 5d. The controlling unit 32b judges whether the transmitter 2 mounted on the left rear wheel 6d responds to the trigger signal. When the transmitter 2 does not respond twice consecutively, and the number of re-tries is equal to or less than the predetermined number of times (five times, herein), the controlling unit 32b determines that a re-try is required for the left rear wheel 6d and stores data indicating that trigger signal re-transmission is to be performed. If the transmitter 2 does not respond even when the number of re-tries exceeds the predetermined number of times, the controlling unit 32b outputs a signal to the display 4 indicating an abnormality in the transmitter 2 of the left rear wheel 6d.

In this way, in the re-try processing means, the triggering device 5 is preferably made to output the trigger signal a plurality of times for a single performance of the re-try process. When an instruction is given to consecutively generate the trigger signal a plural number of times in this way, the possibility of the trigger signal reaching the transmitter 2 can be increased. In this case, the re-try processing means can make the trigger signal be outputted at a random interval when making the triggering device 5 output the trigger signal a plural number of times.

At subsequent Step 220, the re-try process is performed. In the re-try process, when the data indicating the performance of the trigger signal transmission is stored at the above-described Step 120, Step 150, Step 180, and Step 210, the controlling unit 32b transmits a signal instructing the triggering device 5 to output the trigger signal (a re-try trigger signal Sig.retry shown in FIG. 5B, FIG. 6B, and FIG. 10B), based on the data. The triggering device 5 corresponds to the wheel for which the re-try is performed, among the wheels 6a to 6d.

Figure 4A:
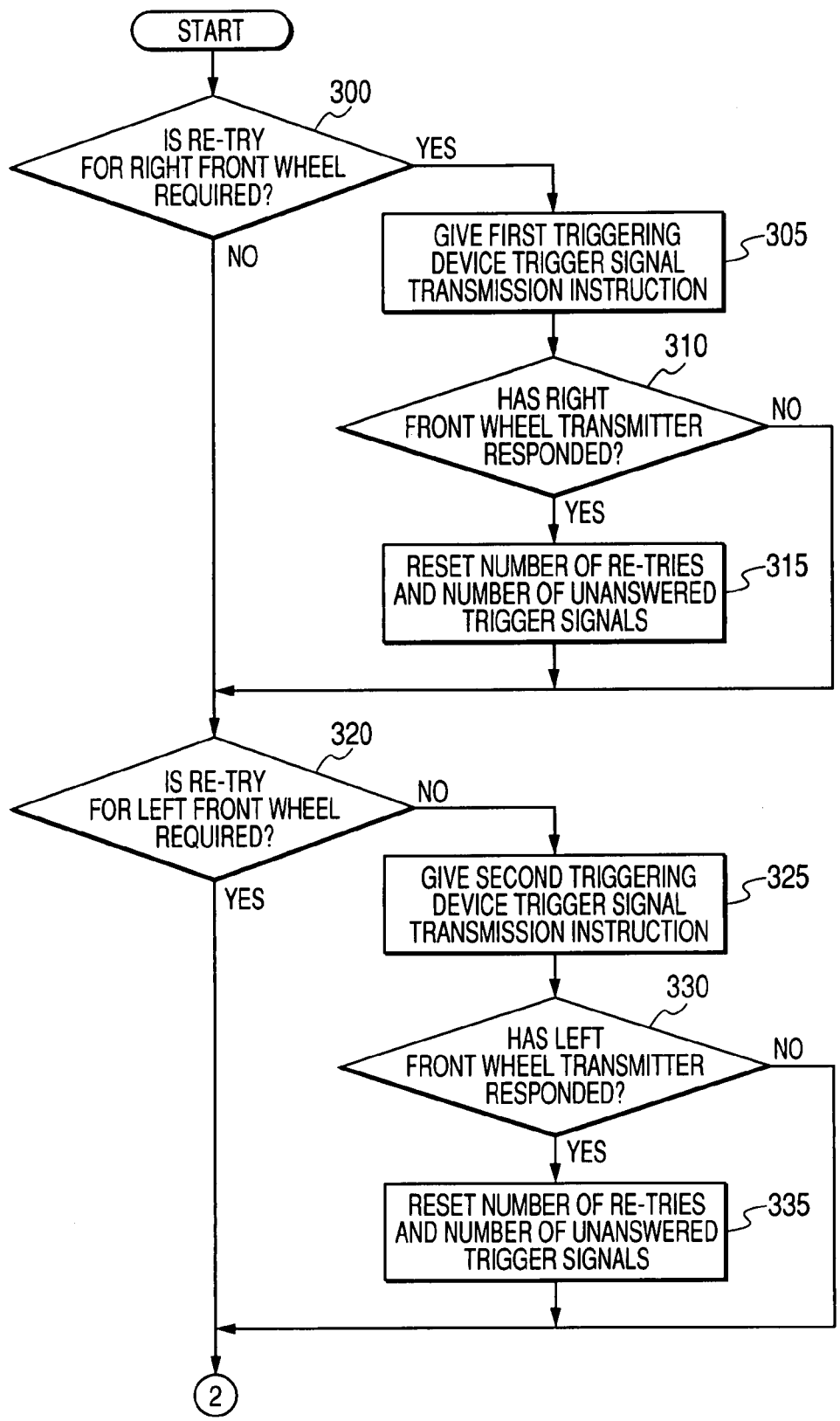
FIG. 4A is a flowchart of a re-try process performed by the controlling unit of the receiver in FIG. 2B.
Figure 4B:
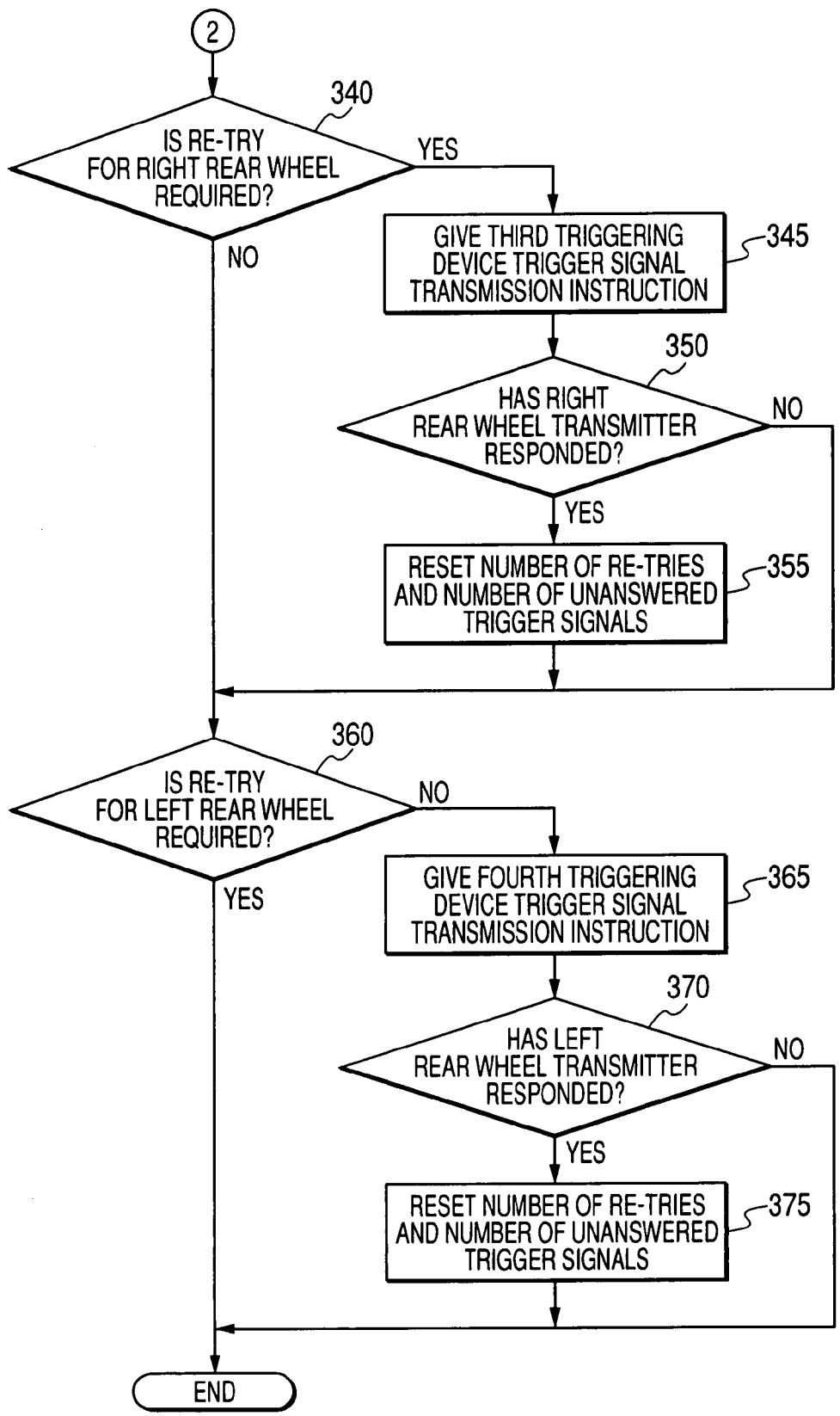
FIG. 4B is a flowchart of the re-try process continued from FIG. 4A.

FIG. 4A and FIG. 4B are flowcharts of the re-try process in detail. As shown in the diagrams, in the re-try process, first, at Step 300, whether the re-try is required to be performed for the right front wheel 6a is judged. The judgment is made based on whether the data (such as a flag indicating the necessity of re-try) indicating the re-transmission of the trigger signal has been stored at the above-described Step 120. When the re-try is judged to be required, the controlling unit 32b proceeds to Step 305. As at Step 100, the controlling unit 32b outputs a signal instructing the first triggering device 5a to output the trigger signal. The controlling unit 32b also simultaneously increments the number of re-tries by one.

As a result, after a predetermined amount of time has passed after the completion of the tire air pressure detection for all wheels 6a to 6d, the trigger signal (Sig.retry) for the re-try is outputted. The instruction can be for the generation of a single trigger signal. However, the instruction is preferably for the generation of a plurality of consecutive trigger signals for a single re-try process, to increase the possibility of the trigger signal reaching the transmitter 2.

As a result of the process, the first triggering device 5a outputs the trigger signal. At Step 310, as at Step 105, whether the transmitter 2 mounted on the right front wheel 6a has responded is judged. When the transmitter 2 has responded, the controlling unit 32b proceeds to Step S315 and resets the counter values of the counter for the number of re-tries and the counter for the number of unanswered trigger signals to zero. When the transmitter 2 does not respond, the number of re-tries is left unchanged.

Then, at Step 320 to Step 335, the same processes as those at Step 300 to Step 315 are performed for the left front wheel 6b. Subsequently, at Step 340 to Step 355, the same processes as those at Step 300 to Step 315 are performed for the right rear wheel 6c. Finally, at Step 360 to Step 375, the same processes as those at Step 300 to Step 315 are performed for the left rear wheel 6d. The re-try process is performed in this way, and the tire air pressure detection is completed.

A tire air pressure detection process such as this is performed at a predetermined cycle after the ignition switch is switched from OFF to ON. If the responses from each transmitter 2 attached to each wheel 6a to 6d are continuously received, the tire air pressure is acquired at the predetermined cycle. When the responses stop, the triggering device 5 corresponding to the relevant wheel is instructed to output the trigger signal at a timing differing from the steady transmission. Whether an abnormality has occurred in the transmitter 2 is determined.

A means of performing the re-try process for outputting the trigger signal at a timing differing from the steady transmission, such as this, is referred to as a "shifted re-try timing re-detecting means".

In the tire air pressure detection process, when the transmitter 2 has responded, data indicating the tire air pressure and data indicating the temperature within the tire are extracted from the received frame. Temperature correction is performed as required based on the data indicating the temperature. At this time, the transmitter 2 basically transmits the frame in response to the trigger signal from the triggering device 5. Therefore, when the receiver 3 receives the frame, the transmitter 2 from which the frame has been transmitted can be identified. However, if required, the wheel on which the transmitter 2 that has transmitted the frame is mounted can be determined from among the four wheels 6a to 6d, based on the ID information stored in the frame.

For example, in a different flow (not shown), when a difference between the determined tire air pressure and a previously determined tire air pressure does not exceed a predetermined threshold value and the change in the tire air pressure is small, the cycle at which the tire air pressure is detected remains as is (such as every minute). When the predetermined threshold value is exceeded and the change in the tire air pressure is large, the cycle is quickened (such as every five seconds). Subsequently, if the determined tire air pressure is judged to be lower than the predetermined threshold value, the controlling unit 32b outputs a signal notifying the display 4 of the judgment. The notification is displayed by the display 4 so that the wheel having the decreased tire air pressure can be identified from among the four wheels 6a to 6d. As a result, the driver can be notified of the wheel among the wheels 6a to 6d having the decreased air pressure.

When the ignition switch is switched from ON to OFF, the controlling unit 32b of the receiver 3 again outputs the trigger instruction signal to the triggering device 5. The triggering device 5 outputs the trigger signal. When the trigger signal is inputted into the controlling unit 22a, via the reception antenna 25 and the receiving unit 22c, the transmitter 2 switches to a sleep state. As a result, the tire air pressure detection performed by the tire air pressure detecting device is completed. At this time, a command instructing the transmitter 2 to enter the sleep state is included in the trigger signal, and the trigger signal is transmitted. When the transmitter 2 receives the trigger signal, the controlling unit 22a receives the trigger signal and the transmitter 2 enters the sleep state.

For reference, a timing chart of when the tire air pressure detection process, described above, is performed is shown in FIG. 5A and FIG. 5B. FIG. 5A is a timing chart of when an abnormality does not occur in the transmitter 2 mounted on each wheel 6a to 6b. FIG. 5B is a timing chart of when an abnormality occurs in the transmitter 2 mounted on the right rear wheel 6c.

As shown in FIG. 5A, the controlling unit 32b outputs the trigger instruction signal to the first triggering device 5a, the second triggering device 5b, the third triggering device 5c, and the fourth triggering device 5d simultaneously with the ignition switch being turned ON. The first triggering device 5a, the second triggering device 5b, the third triggering device 5c, and the fourth triggering device 5d successively output the trigger signals. In response, each transmitter 2 mounted on the wheels 6a to 6d transmits the frame storing the tire air pressure-related data and the ID information.

When the receiver 3 receives the frames, the tire air pressure detection is performed until the ignition switch is switched to OFF.

At the same time, as shown in FIG. 5B, when the transmitter 2 mounted on the right rear wheel 6c, for example, does not respond twice consecutively during the tire air pressure detection such as that described above, the controlling unit 32b stores the data in the memory 32m indicating that the trigger signal transmission is to be performed. Based on the data, the controlling unit 32b outputs the trigger instruction signal to the third triggering device 5c corresponding to the right rear wheel 6c. The tire air pressure detection for the right rear wheel 6c is retried by the third triggering device 5c consecutively outputting the trigger signal (Sig.retry) a predetermined number of times. If the transmitter 2 mounted on the right rear wheel 6c has failed, the transmitter 2 does not respond even when the re-try is performed. A signal indicating that the transmitter 2 mounted on the right rear wheel 6c has failed is sent to the display 4, as described above, and the display 4 displays the information.

As described above, according to the embodiment, in an unresponsive state in which a response from the transmitter 2 is not received, and in this case, when the unresponsive state continues a predetermined number of times, the re-try is performed because an abnormality may have occurred in the transmitter 2. The re-try is performed by the triggering device 5 corresponding to the relevant wheel being instructed to output the trigger signal at a timing differing from the steady transmission. Whether an abnormality has occurred in the transmitter 2 is determined. Therefore, whether the unresponsive state of the transmitter 2 (in other words, a state in which the receiver 3 cannot receive the frame) is caused by an abnormality in the transmitter 2 or by another cause can be accurately determined.

A re-try such as this is only required to be performed for the wheel of which the frame cannot be successfully received. Only the triggering device 5 corresponding to the wheel, among the first triggering device 5a, the second triggering device 5b, the third triggering device 5c, and the fourth triggering device 5d is required to output the trigger signal again.

In other words, the re-try is only required to be performed for the wheel of which the frame cannot be successfully received. Therefore, only the triggering device corresponding to the wheel among a plurality of triggering devices is required to output the trigger signal again.

Specifically, in the re-try processing means, the retry process is performed at a timing differing from the timing at which the transmitter 2, mounted on the each wheel 6a to 6d, transmits the frame. As a result, the reception not being able to be performed because of transmission data being simultaneously transmitted can be prevented. For example, in the re-try processing means, the re-try process can be performed after the timing at which the transmitters 2 mounted on each wheel 6a to 6d transmits the frame.

When a re-try such as this is performed, the possibility of the trigger signal reaching the transmitter 2 can be increased by the trigger signal being consecutively outputted a plural number of times, thereby increasing the possibility of a response being received from the transmitter 2. Therefore, the abnormality in the transmitter 2 can be detected with further accuracy.

Preferably, the second control unit commands the triggering device to resend the trigger signal at a different timing from the predetermined normal timing at which the triggering device normally sends the trigger signal. Such an arrangement of re-try timing can evade batting between the re-try triggering signal and the normal triggering signal.

When a re-try such as this is performed, the re-try is preferably performed while the vehicle 1 is moving. For example, when the trigger signal is outputted when the position of the transmitter 2 happens to be in a location where the trigger signal reception is difficult or the like, the transmitter 2 may again be unable to receive the trigger signal if the re-try is performed while the transmitter 2 is in the same location. If the re-try is performed while the vehicle 1 is moving, the position of the transmitter 2 changes. Therefore, the possibility of the trigger signal being received can be increased. Detection of whether the vehicle 1 is moving can be performed based on the signal from the speed sensor 8 inputted into the controlling unit 32b. The receiver 3 can transmit a trigger signal outputting instruction to the triggering device 5 when a condition, such as the generation of speed, is met.

For example, a step at which whether the vehicle 1 is moving is judged can be provided before Step 300 in FIG. 4, described above. The process subsequent to Step 300 is only performed when the judgment result is YES. When the judgment result is NO and the vehicle 1 is not moving, the re-try is not being performed. Therefore, the re-try process is completed without the number of re-tries being increased. The number of retries is maintained at the value set during the previous process, even when the next tire air pressure detection process shown in FIG. 3 is performed.

In this way, in the second controlling unit 32b, whether the vehicle 1 is moving is preferably detected and the re-try processing means is preferably made to perform the re-try process while the vehicle 1 is moving.

When the trigger signal is outputted when the position of the transmitter 2 happens to be in a location where the trigger signal reception is difficult or the like, the transmitter 2 may again be unable to receive the trigger signal if the re-try is performed while the transmitter 2 is in the same location. If the re-try is performed while the vehicle 1 is moving, the position of the transmitter 2 changes. Therefore, the possibility of the trigger signal being received can be increased.

However, if the frame cannot be received even when a re-try process such as this is performed, the tire air pressure detecting device can include an information providing device (4) that provides information related to the tire air pressure. The second controlling unit 32b can include a re-try frequency judging means (115, 145, 175, and 205). The re-try processing means counts the number of re-tries, and the re-try frequency judging means judges whether the number of re-tries has reached a frequency decided in advance. When the re-try frequency judging means judges that the number of re-tries has reached the frequency decided in advance, the information providing device can give notification of the abnormality in the transmitter, thereby notifying the driver of the abnormality.

According to the embodiment, the trigger signal can be consecutively outputted a plural number of times at a timing decided in advance (here, a predetermined amount of time after the tire air pressure detection for all wheels 6a to 6d are completed) during the re-try process. The output interval of each trigger signal can also be randomly changed. For example, a table of random numbers and the like can be stored in the controlling unit 32b of the receiver 3, in advance. The output interval of the trigger signals can be set in adherence to the table of random numbers.

Second Embodiment

In the tire air pressure detecting device according to the first embodiment, described above, every time the receiver 3 outputs a trigger signal from the triggering device 5, the transmitter 2 transmits a frame storing the tire air pressure-related data in response.

On the other hand, using the tire air pressure detecting device having the same configuration as that according to the first embodiment, a following embodiment is possible. When the ignition switch is switched from OFF to ON, the transmitter 2 enters the wake-up state based on a first trigger signal outputted by the receiver 3 from the triggering device 5. The transmitter 2 switches to periodic transmission mode, thereby automatically transmitting the frame storing the tire air pressure-related data at a predetermined cycle. When the ignition switch again switches to OFF, the transmitter 2 enters the sleep state based on the second trigger signal outputted by the receiver 3 from the triggering device 5.

According to an embodiment such as this, each transmitter 2 attached to the wheels 6a to 6b automatically transmits the frame storing the tire air pressure-related data, even if the triggering device 5 does not output the trigger signal. Therefore, as the tire air pressure detection process performed by the controlling unit 32b of the receiver 3, the tire air pressure detection process from which Step 100, Step 130, Step 160, and Step 190, described above, are eliminated can be performed.

FIG. 6A and FIG. 6B are timing charts of when a tire air pressure detection process such as this is performed. FIG. 6A is a timing chart of when an abnormality does not occur in the transmitter 2 mounted on each wheel 6a to 6b. FIG. 6B is a timing chart of when an abnormality occurs in the transmitter 2 mounted on the right rear wheel 6c.

As shown in FIG. 6A, the first triggering device 5a, the second triggering device 5b, the third triggering device 5c, and the fourth triggering device 5d successively output the trigger signals simultaneously with the ignition switch being turned ON. In response, each transmitter 2 mounted on the wheels 6a to 6d transmits the frame storing the tire air pressure-related data and the ID information. When the receiver 3 receives the frames, the tire air pressure detection is performed until the ignition switch is switched to OFF. Each transmitter 2 repeatedly performs a process in which the frame storing the tire air pressure-related data is automatically transmitted at a predetermined cycle, even when the trigger signal is not transmitted, until the ignition switch switches from ON to OFF.

At the same time, as shown in FIG. 6B, when the transmitter 2 mounted on the right rear wheel 6c, for example, does not respond twice consecutively during the tire air pressure detection such as that described above, the controlling unit 32b stores the data in the memory 32m indicating that the trigger signal transmission is to be performed. Based on the data, the controlling unit 32b outputs the trigger instruction signal to the third triggering device 5c corresponding to the right rear wheel 6c. The tire air pressure detection for the right rear wheel 6c is retried by the third triggering device 5c consecutively outputting the trigger signal a predetermined number of times. If the transmitter 2 mounted on the right rear wheel 6c has failed, the transmitter 2 does not respond even when the re-try is performed. A signal indicating that the transmitter 2 mounted on the right rear wheel 6c has failed is sent to the display 4, as described above, and the display 4 displays the information.

Third Embodiment

The present invention according to a third embodiment will be described. A tire air pressure detecting device according to the present embodiment is the same as that according to the first embodiment, other than a change in the configuration of the triggering device 5. Only the sections that differ will be described.

Figure 7:
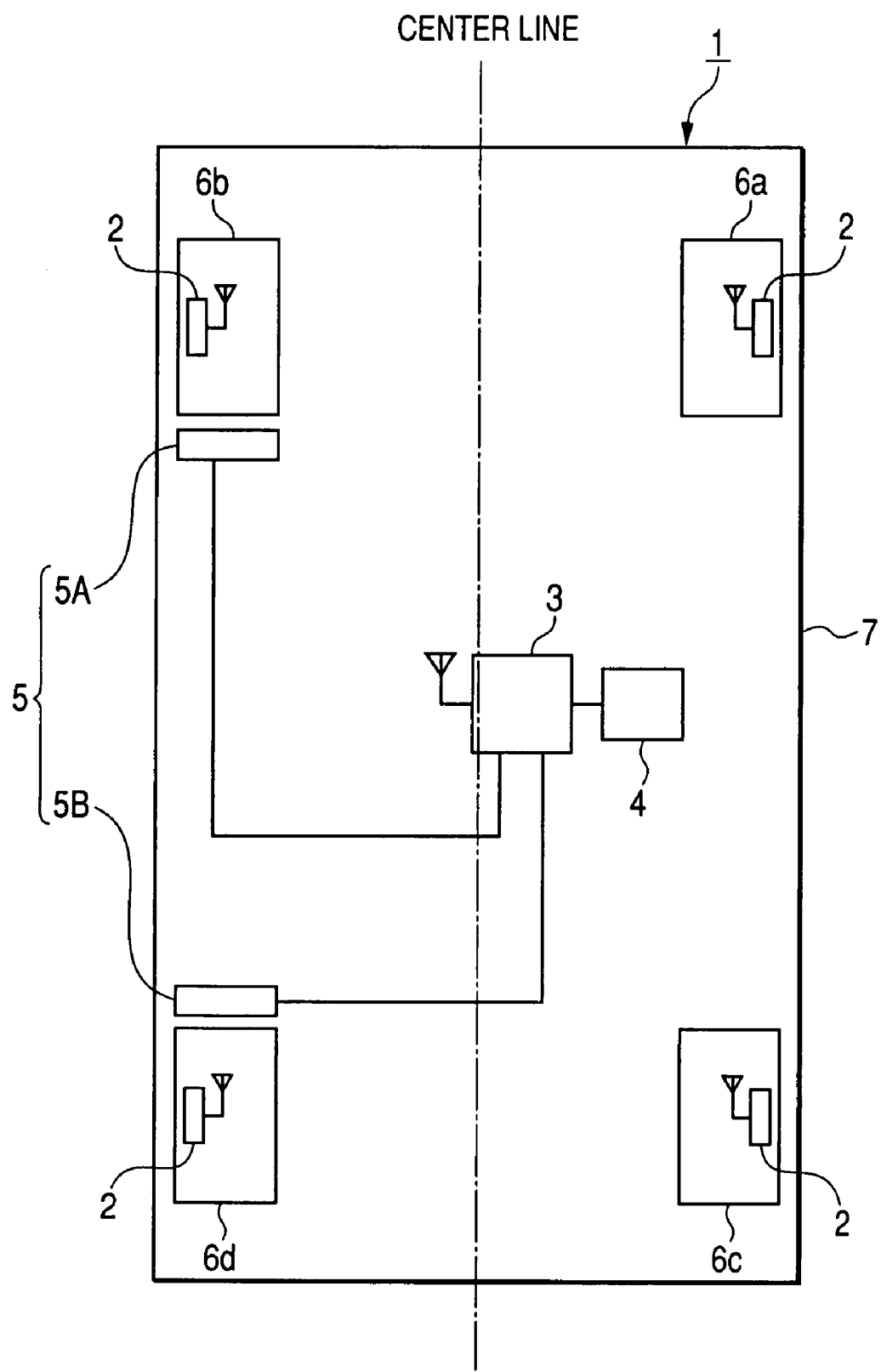
FIG. 7 is a diagram of an overall configuration of a tire air pressure detecting device according to a third embodiment of the invention.

FIG. 7 is a schematic diagram of an overall configuration of the tire air pressure detecting device according to the embodiment. According to the first embodiment and the second embodiment, the triggering device 5 is disposed for each wheel 6a to 6d. However, according to the embodiment, the triggering device 5 includes only two triggering devices, a first triggering device 5a and a second triggering device 5b, as shown in FIG. 7. The first triggering device 5a is used to output the trigger signal to the front wheels 6a and 6b. The second triggering device 5b is used to output the trigger signal to the rear wheels 6c and 6d. According to the embodiment, the trigger signal transmitted from the first triggering device 5a reaches the transmitters 2 attached to the right front wheel 6a and the left front wheel 6b. The trigger signal transmitted from the second triggering device 5b reaches the transmitters 2 attached to the right rear wheel 6c and the left rear wheel 6d.

Each triggering device 5 is disposed to be offset from a center line bilateral-symmetrically dividing the vehicle 1. As a result, each triggering device 5 is a different distance away from the corresponding wheels. According to the embodiment, the first triggering device 5a is disposed near the left front wheel 6b. The second triggering device 5b is disposed near the left rear wheel 6d. Both triggering devices 5 are disposed closer to the left-hand side than to the center line. Therefore, the distance from the first triggering device 5a to the right front wheel 6a is longer than the distance from the first triggering device 5a to the left front wheel 6b. The distance from the second triggering device 5b to the right rear wheel 6c is longer than the distance from the second triggering device 5b to the left rear wheel 6d.

In the a tire air pressure detecting device such as this, when the trigger signal is outputted from the first triggering device 5A, the transmitters 2 mounted on the front wheels 6a and 6b transmits the frames storing the tire air pressure-related data in response. Therefore, in the tire air pressure detecting device according to the embodiment, the controlling unit 32b of the receiver 3 performs the tire air pressure detection such as that shown in FIG. 8.

In the tire air pressure detection process shown here, the first triggering device 5a is instructed to output the trigger signal at Step 100, and the second triggering device 5b is instructed to output the trigger signal at Step 160. The processes at Step 130 to Step 155 and Step 190 to Step 215 are omitted. In this way, the tire air pressure detection process can be changed to that performed by the tire air pressure detecting device according to the embodiment.

According to the embodiment, the controlling unit 22a controls the timing at which the frame is transmitted to the transmitting unit 22b to prevent simultaneous transmissions of data from the transmitters 2. For example, a different transmission timing, indicating the number of seconds after the reception of the trigger signal that the frame is transmitted, is set in advance for each transmitter 2. Therefore, the respective transmitters 2 of the wheels 6a to 6d transmit the frames at different timings.

However, if a different transmission timing is merely stored in the controlling unit 22a of each transmitter 2 to enable each transmitter 2 of each wheel 6a to 6d to transmit the frame at a different timing, the content stored in each transmitter 2 differs. A shared program being stored in the controlling unit 22a of all transmitters 2 can be shared if, for example, a map allowing the transmission timing to be selected depending on the reception strength or a function expression determining the transmission timing using transmission strength as a variable is stored in the controlling unit 22a, allowing the frame transmission timing to be shifted depending on the reception strength, and the respective transmission timings of the transmitters 2 differ by necessity as a result of the differences in the reception strengths.

The program stored in the controlling unit 22a can be set so that the transmission timing is randomly changed every time. When the transmission timing is randomly changed in this way, the probability that all transmission timings of the transmitters 2 differ becomes higher.

Figure 9:
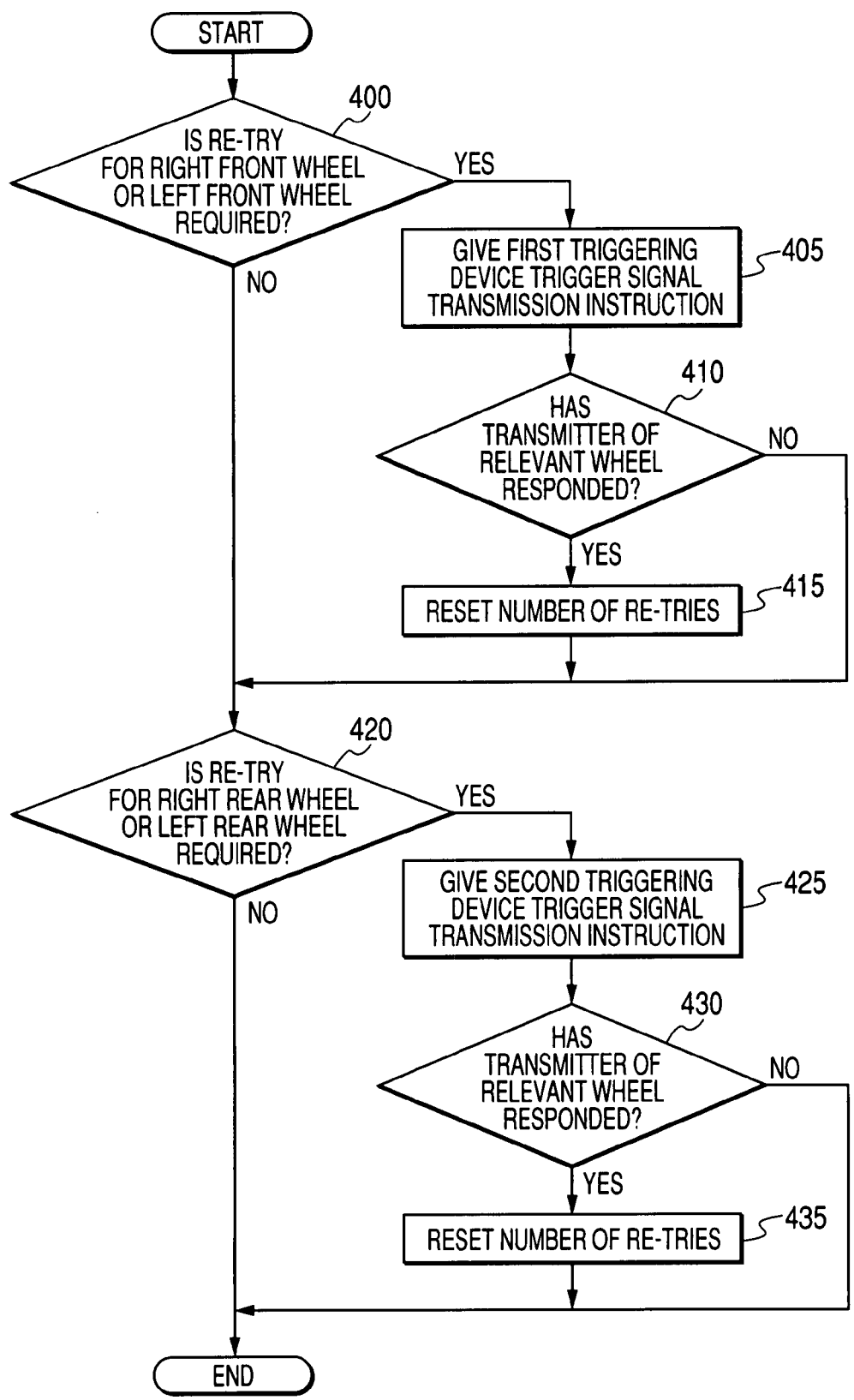
FIG. 9 is a flowchart of a re-try process performed by the controlling unit of the receiver in FIG. 7.

At the same time, in the re-try process, the flowchart shown in FIG. 9 is performed. In other words, at Step 400, the controlling unit 32b judges whether the re-try is required to be performed for the right front wheel 6a or the left front wheel 6b. Because the trigger signal is outputted to the front wheels 6a and 6b from a single triggering device 5, whether the re-try is required for at least either of the front wheels 6a and 6b is judged. When the judgment is YES, the controlling unit 32b proceeds to Step 405. The controlling unit 32b instructs the first triggering device 5a to output the trigger signal and proceeds to Step 410.

At Step 410, whether a response has been received from the transmitter 2 of the wheel requiring the re-try is judged. When the response is received, the controlling unit 32b proceeds to Step 415 and resets the number of re-tries. When the response is not received, the number of re-tries is maintained.

Similarly, at Step 420 to Step 435, the controlling unit 32b instructs the second triggering device 5b to output the trigger signal if the re-try is required to be performed for at least either of the right rear wheel 6c or the left rear wheel 6d. The controlling unit 32b judges whether a response has been received from the transmitter 2 of the wheel requiring the re-try. If the response is received, the number of re-tries is reset. If the response is not received, the number of re-tries is maintained, and the re-try process is completed.

FIG. 10A and FIG. 10B are timing charts of when a tire air pressure detection process such as this is performed. FIG. 10A is a timing chart of when an abnormality does not occur in the transmitter 2 mounted on each wheel 6a to 6d. FIG. 10B is a timing chart of when an abnormality occurs in the transmitter 2 mounted on the right rear wheel 6c.

As shown in FIG. 10A, the first triggering device 5a outputs the trigger signal when the ignition switch is turned ON. In response, each transmitter 2 mounted on the front wheels 6a and 6b transmits the frame storing the tire air pressure-related data and the ID information. Next, the second triggering device 5b outputs the trigger signal. In response, each transmitter 2 mounted on the rear wheels 6c and 6d transmits the frame storing the tire air pressure-related data and the ID information. When the receiver 3 receives the frames, the tire air pressure detection is performed until the ignition switch is switched to OFF.

At the same time, as shown in FIG. 10B when the transmitter 2 mounted on the right rear wheel 6c, for example, does not respond twice consecutively during the tire air pressure detection such as that described above, the controlling unit 32b stores the data indicating that the trigger signal transmission is to be performed. Based on the data, the controlling unit 32b outputs the trigger instruction signal to the second triggering device 5b corresponding to the right rear wheel 6c. The tire air pressure detection for the rear wheels 6c and 6d is retried by the second triggering device 5b consecutively outputting the trigger signal a predetermined number of times. If the transmitter 2 mounted on the right rear wheel 6c has failed, the transmitter 2 does not respond even when the re-try is performed. A signal indicating that the transmitter 2 mounted on the right rear wheel 6c has failed is sent to the display 4, as described above, and the display 4 displays the information.

Fourth Embodiment

The tire air pressure detecting device according to the third embodiment can have the same configuration as that according to the second embodiment. When the ignition switch is switched from OFF to ON, the transmitter 2 enters the wake-up state based on a first trigger signal outputted by the receiver 3 from the triggering device 5. The transmitter 2 switches to periodic transmission mode, thereby automatically transmitting the frame storing the tire air pressure-related data at a predetermined cycle. When the ignition switch again switches to OFF, the transmitter 2 enters the sleep state based on the second trigger signal outputted by the receiver 3 from the triggering device 5.

Figure 8:
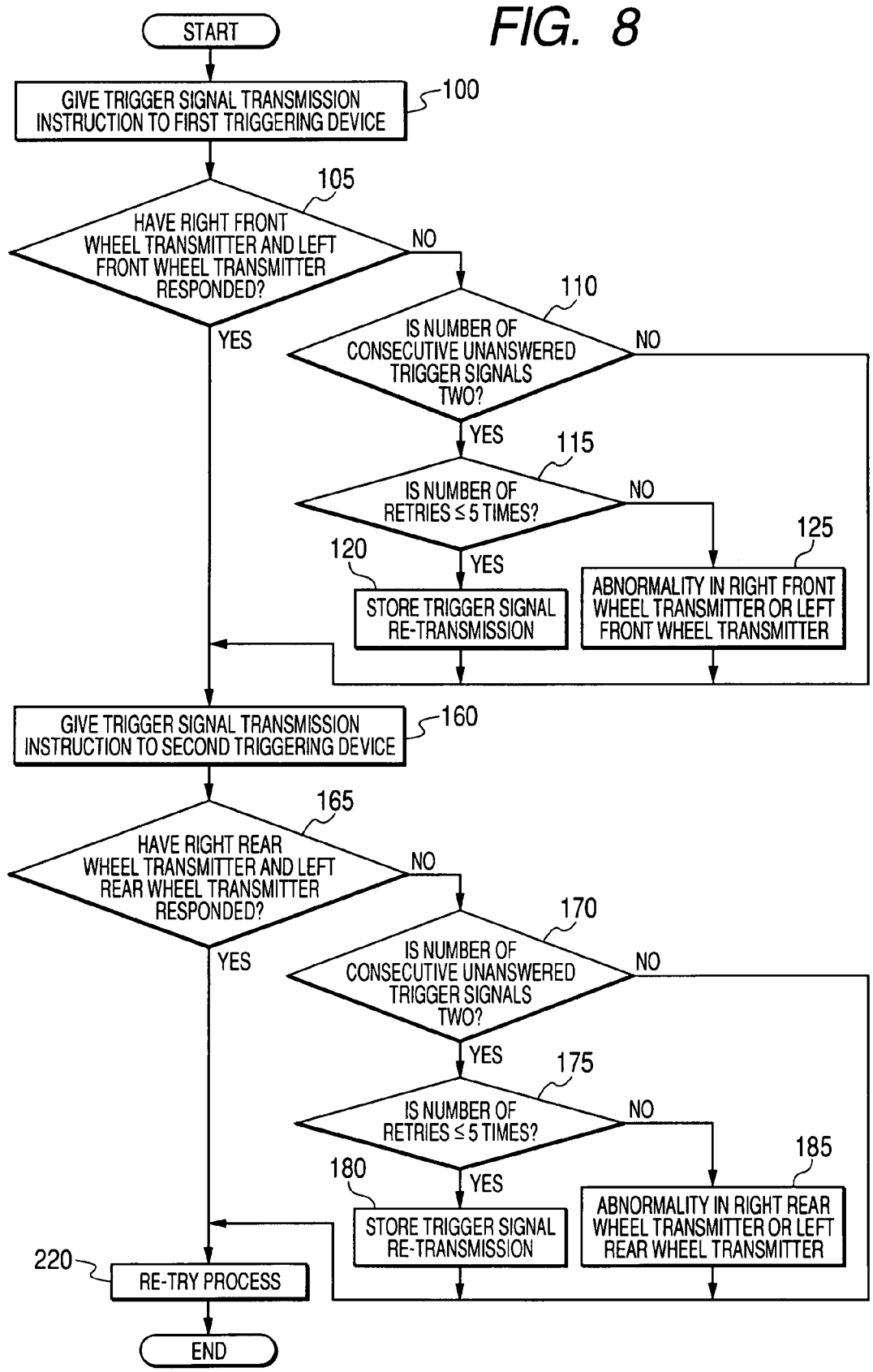
FIG. 8 is a flowchart of a tire air pressure detection process performed by a controlling unit of a receiver in FIG. 7.

According to an embodiment such as this, each transmitter 2 attached to the wheels 6a to 6b automatically transmits the frame storing the tire air pressure-related data, even if the triggering device 5 does not output the trigger signal. Therefore, as the tire air pressure detection process performed by the controlling unit 32b of the receiver 3, the tire air pressure detection process from which the above-described Step 100 and Step 160, shown in FIG. 8, are eliminated can be performed. In the re-try process, each process in FIG. 9 according to the third embodiment is performed.

FIG. 11A and FIG. 11B are timing charts of when a tire air pressure detection process such as this is performed. FIG. 11A is a timing chart of when an abnormality does not occur in the transmitter 2 mounted on each wheel 6a to 6d. FIG. 11B is a timing chart of when an abnormality occurs in the transmitter 2 mounted on the right rear wheel 6c.

As shown in FIG. 11A, the first triggering device 5a outputs the trigger signal when the ignition switch is turned ON. In response, each transmitter 2 mounted on the front wheels 6a and 6b transmits the frame storing the tire air pressure-related data and the ID information. Next, the second triggering device 5b outputs the trigger signal. In response, each transmitter 2 mounted on the rear wheels 6c and 6d transmits the frame storing the tire air pressure-related data and the ID information. When the receiver 3 receives the frames, the tire air pressure detection is performed until the ignition switch is switched to OFF. Each transmitter 2 repeatedly performs a process in which the frame storing the tire air pressure-related data is automatically transmitted at a predetermined cycle, even when the trigger signal is not transmitted, until the ignition switch switches from ON to OFF.

At the same time, as shown in FIG. 11B, when the transmitter 2 mounted on the right rear wheel 6c, for example, does not respond twice consecutively during the tire air pressure detection such as that described above, the controlling unit 32b stores the data indicating that the trigger signal transmission is to be performed. Based on the data, the controlling unit 32b outputs the trigger instruction signal to the second triggering device 5b corresponding to the right rear wheel 6c. The tire air pressure detection for the rear wheels 6c and 6d is retried by the second triggering device 5b consecutively outputting the trigger signal a predetermined number of times. If the transmitter 2 mounted on the right rear wheel 6c has failed, the transmitter 2 does not respond even when the re-try is performed. A signal indicating that the transmitter 2 mounted on the right rear wheel 6c has failed is sent to the display 4, as described above, and the display 4 displays the information.

Other Embodiments

According to the above-described embodiment, the re-try process is performed after the tire air pressure detection is performed for all wheels 6a to 6d. However, when the controlling unit 32b judges that the re-try is required to be performed for each wheel 6a to 6d, the re-try can be performed as required before the tire air pressure detection for the other wheels 6a to 6d is completed.

The number of unanswered trigger signals (see Step 110, Step 140, Step 170, and Step 200 in FIG. 3 and FIG. 8) serving as the judgment criteria for whether the re-try, described according to the embodiment above, is performed and the number of re-tries (see Step 115, Step 145, Step 175, and Step 205 in FIG. 3 and FIG. 8) serving as the judgment criteria for whether an abnormality has occurred in the transmitter 2 are merely examples. Other numbers can be used.

According to the third embodiment and the fourth embodiment, the first triggering device 5a is disposed on the front wheels 6a and 6b side. The second triggering device 5b is disposed on the rear wheels 6c and 6d side. The first triggering device 5a outputs the trigger signal to the right front wheel 6a and the left front wheel 6b as a pair. The second triggering device 5b outputs the trigger signal to the right rear wheel 6c and the left rear wheel 6d as a pair. On the other hand, the first triggering device 5a can be disposed on the left wheels 6b and 6d side. The second triggering device 5b can be disposed on the right wheels 6a and 6c side. The first triggering device 5a can output the trigger signal to the left wheels 6b and 6d as a pair. The second triggering device 5b can output the trigger signal to the right wheels 6a and 6c as a pair.

In this case, if the first triggering device 5a is disposed closer to one wheel than the other, among the left wheels 6b and 6d, and the second triggering device 5b is disposed closer to one wheel than the other, among the right wheels 6a and 6c, the reception strengths become different values when the first triggering device 5a and the second triggering device 5b output the trigger signals. Therefore, the same advantages as those achieved according to the embodiment can be achieved.

According to the first embodiment and the second embodiment, the triggering device 5 includes four triggering devices, the first triggering device 5a, the second triggering device 5b, the third triggering device 5c, and the fourth triggering device 5d. According to the third embodiment and the fourth embodiment, the triggering device 5 includes two triggering devices, the first triggering device 5a and the second triggering device 5b. However, if the trigger signal can reach all transmitters 2, a single triggering device 5 can be provided so that the all distances from the triggering device 5 to each wheel 6a to 6d differ.

According to the embodiment, when the invention according to the embodiment is applied to a four-wheel vehicle is described. However, the vehicle is not limited to the four-wheel vehicle. The present invention can be applied to a wheel position detecting device and a tire air pressure detecting device provided in a vehicle including more than four wheels, such as a large vehicle.

According to the embodiment, whether the vehicle 1 is moving is detected based on the detection signal from the speed sensor 8. However, the detection can be performed based other known signals and on detection signals from a wheel speed sensor, a longitudinal acceleration sensor, and the like.

The steps shown in each diagram correspond with the means performing various processes. For example, a section performing the processes indicated at Step 105, Step 135, Step 165, and Step 195 is equivalent to a judging means. A section performing the process indicated at Step 220 is equivalent to a re-try processing means. A section performing the processes indicated at Step 110, Step 140, Step 170, and Step 200 is equivalent to an unanswered trigger signal frequency judging means. A section performing the processes indicated at Step 115, Step 145, Step 175, and Step 205 is equivalent to a re-try frequency judging means.

What is claimed is:

1. A detecting apparatus for detecting an air-pressure of a tire fitted around each of a plurality of wheels provided on a body of a vehicle, said detecting apparatus comprising:
   a triggering device provided on the body;
   a plurality of transmitters, one transmitter being provided on each of the plurality of wheels; and
   a receiver provided on the body;
   the triggering device sending a trigger signal to the plurality of transmitters so that the trigger signal reaches the plurality of transmitters;
   each of the plurality of transmitters comprising:
      a sensing unit sensing a datum representing the air-pressure of tire;
      a first receiving unit receiving the trigger signal from the triggering device;
      a first control unit getting the datum from the sensing unit, embedding the datum into a frame, and outputting the frame to when receiving the trigger signal; and
      a transmitting unit receiving the frame output from the first control unit and transmitting the frame at a timing; and
   the receiver comprising:
      a second receiving unit receiving the frame sent by each of the plurality of transmitters;
      a second control unit comprising:
         a calculating unit calculating the air-pressure of a tire fitted around each of the plurality of wheels based on the datum embedded in the frame;
         a judging unit judging whether or not the second receiving unit receives the frame at the timing of sending a frame by the transmitting unit; and
         a retrying unit commanding the triggering device to resend the trigger signal at a different timing from the timing of a transmitting frame by the transmitting unit of the transmitter when the judging unit judges that the second receiving unit fails to receive the frame.

2. The detecting apparatus of claim 1, wherein the second control unit further comprises:
   a second judging unit judging whether or not the number of frames received by the receiver reaches a predetermined number, and commanding the retrying unit to command the triggering device to resend the trigger signal when the number of frames received by the receiver fails to reach the predetermined number.

3. The detecting apparatus of claim 1 comprising at least two of said triggering device, each of the triggering devices being dedicated to a specified one of the plurality of transmitters, and
   wherein the retrying unit commands only the triggering device dedicated to the wheel judged to fail to receive the frame to resend the trigger signal.

4. The detecting apparatus of claim 1, wherein the second control unit commands the triggering device to resend the trigger signal at a different timing from any of the timing of transmitting a frame by any of the transmitting units of the transmitters.

5. The detecting apparatus of claim 1, wherein:
   the second control unit commands the triggering device to resend the trigger signal after the transmitting unit transmits the frame to each of the plurality of transmitters.

6. The detecting apparatus of claim 1, wherein the retrying unit commands the triggering device to resend the trigger signal more than one time.

7. The detecting apparatus of claim 6, wherein the retrying unit commands the triggering device to resend the trigger signal more than one time at a random timing.

8. The detecting apparatus of claim 1, wherein the second control unit detects whether or not the vehicle is running and the retrying unit commands the triggering device to resend the trigger signal when the second control unit detects that the vehicle is running.

9. The detecting apparatus of claim 1, further comprising:
   a display displaying information with regards to air-pressure of a tire, and the second control unit counting up the number of commanding-occurrences of the retrying unit commanding the triggering device to resend the trigger signal,
   the detecting apparatus further comprising a third judging unit judging whether or not the number of commanding-occurrences exceeds a predetermined number of occurrences, and commanding the display to display information that the transmitter is in failure when judged by the third judging unit that the number of commanding-occurrences exceeds the predetermined number of occurrences.

10. The detecting apparatus of claim 1, wherein the triggering device normally sends the trigger signal at a predetermined normal timing, and the second control unit commands the triggering device to resend the trigger signal at a different timing from the predetermined normal timing.

* * * * *